United States Patent
Pan

(10) Patent No.: US 10,825,014 B2
(45) Date of Patent: Nov. 3, 2020

(54) APPARATUS AND METHOD FOR CONTROLLING RUNNING OF MULTIPLE SECURITY SOFTWARE APPLICATIONS

(71) Applicant: Huawei Technologies Co., Ltd., Shenzhen (CN)

(72) Inventor: Shilin Pan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 16/159,095

(22) Filed: Oct. 12, 2018

(65) Prior Publication Data

US 2019/0050844 A1 Feb. 14, 2019

Related U.S. Application Data

(63) Continuation of application No. PCT/CN2017/078314, filed on Mar. 27, 2017.

(30) Foreign Application Priority Data

Apr. 14, 2016 (CN) .......................... 2016 1 0232101

(51) Int. Cl.
  *G06F 3/06* (2006.01)
  *G06Q 20/32* (2012.01)
  *G06F 21/79* (2013.01)

(52) U.S. Cl.
  CPC .......... *G06Q 20/3229* (2013.01); *G06F 3/06* (2013.01); *G06F 21/79* (2013.01); *G06Q 20/3227* (2013.01); *G06Q 20/3278* (2013.01)

(58) Field of Classification Search
  CPC .................................. G06F 3/06; G06F 21/78
  (Continued)

(56) References Cited

U.S. PATENT DOCUMENTS 5,916,440 A  6/1999 Garcera et al.
8,146,093 B2 * 3/2012 Li .......................... G06F 9/441
                                                        718/106

(Continued)

FOREIGN PATENT DOCUMENTS

CN  103049694 A  4/2013
CN  104778794 A  7/2015

(Continued)

OTHER PUBLICATIONS

Foreign Communication From A Counterpart Application, Indonesian Application No. P00201809165, Indonesian Office Action dated Aug. 2, 2019, 2 pages.

*Primary Examiner* — Jacob Lipman
(74) *Attorney, Agent, or Firm* — Conley Rose, P.C.

(57) ABSTRACT

An apparatus for controlling running of multiple security software applications, including: a secure element and at least one central processing unit coupled to the secure element, where the secure element includes a processor and a first random access memory; the processor is configured to: run secure operating system software and at least one security software application based on the secure operating system software; when it is required to run a second security software application, suspend running of a first security software application in the at least one security software application, control migrating first temporary data generated during running of the first security software application from the first random access memory to a storage device disposed outside the secure element, and based on the secure operating system software, run the second security software application.

18 Claims, 5 Drawing Sheets

(58) Field of Classification Search
USPC .......................................................... 726/29
See application file for complete search history.

(56) References Cited

U.S. PATENT DOCUMENTS

| | | |
|---|---|---|
| 2007/0294494 A1 | 12/2007 | Conti et al. |
| 2010/0095348 A1* | 4/2010 | Foster ................. G06F 21/6236 726/1 |
| 2010/0174631 A1 | 7/2010 | Tian et al. |
| 2013/0171029 A1 | 7/2013 | Clymans |
| 2017/0103378 A1 | 4/2017 | Pan |

FOREIGN PATENT DOCUMENTS

| | | |
|---|---|---|
| CN | 105912272 A | 8/2016 |
| EP | 0207161 B1 | 7/1989 |
| EP | 2966628 A1 | 1/2016 |
| WO | 2006094723 A1 | 9/2006 |
| WO | 2007134670 A1 | 11/2007 |
| WO | 2007134671 A1 | 11/2007 |
| WO | 2011112199 A8 | 9/2011 |

* cited by examiner

APPARATUS AND METHOD FOR CONTROLLING RUNNING OF MULTIPLE SECURITY SOFTWARE APPLICATIONS

CROSS-REFERENCE TO RELATED APPLICATIONS

This application is a continuation of International Application No. PCT/CN2017/078314 filed on Mar. 27, 2017, which claims priority to Chinese Patent Application No. 201610232101.0 filed on Apr. 14, 2016. The disclosures of the aforementioned applications are hereby incorporated by reference in their entireties.

TECHNICAL FIELD

The present application relates to the field of system security technologies, and in particular, to an apparatus and a method for controlling running of multiple security software applications.

BACKGROUND

Mobile payment is a service manner in which a user is allowed to use a mobile terminal, for example, a mobile phone, a tablet computer, or a wearable apparatus, to pay for purchased goods or services. Currently, there are three manners of implementing mobile payment by using the mobile terminal: a secure digital (SD) card solution, a subscriber identity module (SIM) solution, or an all-terminal solution in which near field communication (NFC) is combined with a secure element (SE). Currently, the all-terminal solution in which near field communication is combined with a secure element becomes a mainstream solution for implementing mobile payment.

An existing all-terminal solution is shown in FIG. 1. A mobile terminal 10 communicates with a point of sale (POS) terminal 11 by using a near field communication unit 101 inside the mobile terminal 10. A short-range wireless communications link 12 between the near field communication unit 101 and the POS terminal 11 is a bidirectional channel, and may be implemented by using various applicable short-range wireless communication protocols, to implement a basic wireless communication function in mobile payment. For example, the communications link 12 may be used to transmit POS instruction data or the like from the POS terminal 11 to the near field communication unit 101 inside the mobile terminal 10. A secure element 102 may be a component coupled to an independent central processing unit (CPU) 103 and configured to: run various functions related to a financial payment service, and store data such as a key or a certificate that is related to a banking service. During a transaction, the secure element 102 receives POS instruction data from the near field communication unit 101, parses the instruction data, and makes a corresponding response according to a financial transaction agreement. The response is fed back by the near field communication unit 101 to the POS terminal 11, to complete data transmission in mobile payment, so as to implement a function of the mobile terminal 10 serving as a transaction verification card. The central processing unit 103 runs general-purpose operating system software 1031, for example, Android system software. The central processing unit 103 is configured to control the near field communication unit 101 and the secure element 102, for example, control enabling or disabling of the near field communication unit 101 and the secure element 102. In addition, the mobile terminal 10 may include an input unit 104. The input unit 104 may be a touchscreen, and may be configured to exchange a message with a user by using a user interface (UI). Therefore, the user can enter an operation instruction on the input unit 104 by using the UI, so as to instruct the operating system software 1031 and a related software application to perform related operations. The operation instruction may include transaction confirmation, entering a personal transaction password, or the like. As a transaction terminal device, the POS terminal 11 accesses a cloud server 14 on a network side by using the Internet, so as to compute and complete a payment service by using the server 14. The server 14 on the network side is usually operated by a bank.

The all-terminal solution may include online payment and offline payment. As shown in FIG. 1, during the offline payment, non-contact card swiping, that is, swiping of a mobile phone, is performed between the mobile terminal 10 and the POS terminal 11. The near field communication unit 101 and the secure element 102 cooperate to complete a payment transaction. The online payment may be implemented without the near field communication unit 101. In this case, the central processing unit 103 and the secure element 102 may access the Internet by using a mobile communications network to implement the online payment, and the secure element 102 functions as a USB key of a bank and is configured to store and verify a certificate of the bank. Therefore, the near field communication unit 101 in FIG. 1 is optional. Specifically, referring to FIG. 1, during the online payment, the mobile terminal 10 may further include a mobile communications unit 105, configured to replace a role of the near field communication unit 101 during the offline payment. The mobile communications unit 105 accesses a radio access network (RAN) 15, specifically, a base station in the radio access network 15, and accesses the Internet by using the radio access network 15. The Internet is connected to the server 14 in the Internet, so that the server 14 receives instruction data or transmits information to the secure element 102. The secure element 102 parses the instruction data and makes a corresponding response according to a financial transaction agreement, so that the mobile communications unit 105 transmits data to the server 14 on the network side by using the mobile Internet. In this case, the mobile communications unit 105 may be a unit running a cellular radio communication protocol, and is configured to connect the mobile terminal 10 to the Internet by using a cellular radio communications link 13. The mobile communications unit 105 may specifically run a cellular radio communication protocol such as Global System for Mobile Communications (GSM), Universal Mobile Telecommunications System (UMTS), Worldwide Interoperability for Microwave Access (WiMAX), or Long Term Evolution (LTE), so as to implement a mobile Internet function of the mobile terminal 10.

Chinese Patent Application 201510201343.9 provides a solution that the secure element 102 and the central processing unit 103 (or optionally including the mobile communications unit 105) are integrated into a same circuit substrate, that is, integrated into a master chip 106. In addition, the secure element 102 can load general-purpose operating system software, such as Android or Windows, required by the central processing unit 103 from a storage unit outside the master chip 106.

As mobile application scenarios develop, the secure element 102 runs increasingly more types of software applications, and application scenarios of the secure element 102 are not limited to mobile payment and may further include some SIM (subscriber identity module) card-related software, for example, a software application customized by a communications operator. As a quantity of software applications run by the secure element 102 increases, there is a higher demand for memory space used to run the corresponding software applications in the secure element 102. However, expanding the memory space of the secure element 102 may increase an area and costs of the secure element 102.

SUMMARY

Embodiments of the present application provide an apparatus and a method for controlling running of multiple security software applications, so as to save memory space of a secure element for running at least one security software application in the apparatus.

According to a first aspect, an embodiment of the present application provides an apparatus for controlling running of multiple security software applications. The apparatus includes: a secure element and at least one central processing unit coupled to the secure element; the secure element includes a processor and a first random access memory; the at least one central processing unit is configured to: run general-purpose operating system software, and communicate with the secure element under an action of the general-purpose operating system software; the processor is configured to run secure operating system software and at least one security software application based on the secure operating system software; the first random access memory is configured to temporarily store secure temporary data generated during running of the secure operating system software and the at least one security software application; and the processor is further configured to: when it is required to run a second security software application, suspend running of a first security software application in the at least one security software application, control migrating first temporary data generated during running of the first security software application from the first random access memory to a storage device disposed outside the secure element, and based on the secure operating system software, run the second security software application, where second temporary data generated during running of the second security software application is temporarily stored in the first random access memory.

According to a technical solution provided in the first aspect, the processor can suspend at least some running security software applications, so that at least some memory space of the first random access memory is saved, and used to run the second security software application, thereby implementing dynamic suspension or loading of the security software application. That is, this technical solution implements the following: A security software application that needs to run is used to replace some running security software applications, and temporary data generated during running of the replaced security software applications is migrated to an external storage device. This avoids consuming more memory space of the first random access memory, so that there is no need to design extremely large memory space of the first random access memory, thereby reducing an area and costs of the secure element.

Optionally, the processor may be designed to run only one security software application at one moment. The processor replaces a running security software application by dynamically suspending the running security software application and loading another security software application that needs to run, so that a demand for the memory space of the first random access memory is minimized.

Optionally, the first random access memory may be an SRAM (static random access memory), a DRAM (dynamic random access memory), or an SDRAM (synchronous dynamic random access memory).

Optionally, the at least one central processing unit may be an advanced reduced instruction set computer machine (Advanced RISC Machine, ARM) processor.

Optionally, that the at least one central processing unit communicates with the secure element under the action of the general-purpose operating system software may include the following: The at least one central processing unit may control running of the secure element. For example, the control of running of the secure element may include at least one of enabling the secure element, disabling the secure element, controlling the secure element to enter a low power-consuming state, and adjusting an operating voltage, an operating current, or a clock rate of the secure element 204. For example, the communication may follow an IPC (interprocess communication) rule or protocol.

Optionally, each of the at least one security software application or the second security software application occupies a preset space resource (or referred to as a channel) in the storage device.

According to the first aspect, in a first possible implementation of the first aspect, the processor includes a first processing unit, configured to run the secure operating system software and the first security software application based on the secure operating system software, and further configured to: suspend running of the first security software application, control migrating the first temporary data to the storage device, and based on the secure operating system software, run the second security software application. Optionally, the first processing unit may be a central processing unit. In this implementation, because running of the security software application and migration of the temporary data are implemented by a same processing unit, complexity of the processor may be reduced.

According to the first aspect, in a second possible implementation of the first aspect, the processor includes a first processing unit and a second processing unit; the first processing unit is configured to: run the secure operating system software and the first security software application based on the secure operating system software, and when it is required to run the second security software application, suspend running of the first security software application and trigger migration of the first temporary data; the second processing unit is configured to control, based on triggering of the first processing unit, migrating the first temporary data to the storage device; and the first processing unit is further configured to run the second security software application based on the secure operating system software after migration of the first temporary data is completed. In this implementation, because running of the security software application and migration of the temporary data are implemented by different processing units, processing efficiency may be improved. Optionally, the first processing unit is a central processing unit. The second processing unit is a DMA (direct memory access) controller.

According to any one of the first aspect or the foregoing possible implementations, in a third possible implementation of the first aspect, the secure element and the at least one central processing unit are located in a first semiconductor chip in the apparatus. Optionally, the apparatus may be a portable electronic device, for example, a mobile phone, a tablet computer, or a wearable apparatus. Because the secure element and the at least one central processing unit are integrated into the first semiconductor chip in the apparatus, an integration level is improved, and costs are reduced. Optionally, the first semiconductor chip in the apparatus may further include a cellular baseband communication processor, a graphics processing unit, or the like.

According to any one of the first aspect or the foregoing possible implementations, in a fourth possible implementation of the first aspect, the storage device is located in a second semiconductor chip in the apparatus. Optionally, the storage device is a second random access memory. Because the storage device is an independent chip disposed outside the secure element, memory space of the storage device is relatively large, and the storage device may be fully used to perform the technical solution of this embodiment.

Optionally, the second random access memory may be an SRAM (static random access memory), a DRAM (dynamic random access memory), or an SDRAM (synchronous dynamic random access memory). Preferably, the second random access memory is a DDR SDRAM (double data rate synchronous dynamic random access memory).

According to any one of the first aspect or the foregoing possible implementations, in a fifth possible implementation of the first aspect, the storage device includes a secure storage area, where the secure storage area is dedicated to temporarily storing third temporary data of one or more security software applications that are temporarily suspended by the processor. Optionally, the storage device may be shared by the secure element and the at least one central processing unit. The storage device may store both temporary data or intermediate data generated by the at least one central processing unit and the third temporary data generated by the secure element. Space or an area that is dedicated to temporarily storing the third temporary data about the security software application is divided from the storage device, so as to implement isolation between the temporary data generated by the at least one central processing unit and the third temporary data, thereby improving security. The secure storage area is only used to store the third temporary data, and cannot be accessed by the at least one central processing unit. Therefore, security isolation is good. Optionally, the third temporary data may include temporary data of each security software application in the suspended one or more security software applications.

According to the fifth possible implementation of the first aspect, in a sixth possible implementation of the first aspect, the processor is further configured to: when it is required to end a third security software application in the one or more security software applications that are temporarily suspended by the processor, control the storage device to delete fourth temporary data generated during running of the third security software application from the third temporary data. If any security software application is completely ended, temporary data generated during running of the security software application is deleted from the storage device.

According to any one of the first aspect or the foregoing possible implementations, in a seventh possible implementation of the first aspect, the apparatus further includes a third random access memory, coupled to the secure element; and the first temporary data is migrated by the processor from the first random access memory to the third random access memory, and further migrated to the storage device. Optionally, the secure element migrates the first temporary data that needs to be migrated to the third random access memory, and the at least one central processing unit or a controller corresponding to the at least one central processing unit is configured to migrate the first temporary data from the third random access memory to the storage device. Optionally, the third random access memory is a memory required for data exchange between the at least one central processing unit and the secure element. The data exchange may follow the interprocess communication protocol. Optionally, the at least one central processing unit and the processor of the secure element exchange control information by using the interprocess communication protocol or an interrupt instruction, so as to migrate the first temporary data by using the third random access memory as a relay.

According to any one of the first aspect or the foregoing possible implementations, in an eighth possible implementation of the first aspect, the second security software application is a newly-started security software application. Optionally, the at least one central processing unit may send a start instruction to the secure element, so that the processor in the secure element starts the second security software application.

According to any one of the first aspect or the foregoing possible implementations, in a ninth possible implementation of the first aspect, the second security software application is a security software application that is ever suspended by the processor and is run again; and the processor is configured to: when suspending the second security software application, migrate the second temporary data from the first random access memory to the storage device; and when it is required to run the second security software application again, migrate the second temporary data from the storage device back to the first random access memory. Optionally, the second security software application may be suspended for multiple times and is migrated from the first random access memory to the storage device by the processor each time the second security software application is suspended, and the processor migrates the second temporary data back to the first random access memory each time the second security software application needs to be rerun, so as to implement flexible dynamic suspension and loading of the security software application.

According to the ninth possible implementation of the first aspect, in a tenth possible implementation of the first aspect, the processor obtains the second temporary data from the first random access memory, and before migrating the second temporary data to the storage device, performs at least one of encryption or a message authentication code MAC (message authentication code) operation on the second temporary data; and obtains the second temporary data from the storage device, and before migrating the second temporary data back to the first random access memory, performs at least one of decryption or a MAC verification operation on the second temporary data. Before migrating the second temporary data, the processor may perform the encryption or MAC operation on the second temporary data. Therefore, security is improved. Before rerunning the second security software application, the processor performs the decryption or the MAC verification operation on the second temporary data. Only the second temporary data on which the decryption or the MAC verification operation is performed can to be used continuously.

According to the ninth possible implementation of the first aspect, in an eleventh possible implementation of the first aspect, the apparatus further includes: a cryptographic unit; and the processor is further configured to: obtain the second temporary data from the first random access memory, before migrating the second temporary data to the storage device, provide the second temporary data for the cryptographic unit, and receive the second temporary data after secure processing of the cryptographic unit, where the cryptographic unit is configured to perform at least one security processing of encryption or a MAC operation on the second temporary data, so as to obtain the second temporary data after secure processing; and the processor is further configured to: obtain the second temporary data from the storage device, before migrating the second temporary data back to the first random access memory, provide the second temporary data for the cryptographic unit, and receive the second temporary data after reverse security processing of the cryptographic unit, where the cryptographic unit is further configured to perform at least one reverse security processing of decryption or a MAC verification operation on the second temporary data, so as to obtain the second temporary data after reverse security processing. Unlike the previously mentioned tenth implementation, the cryptographic unit in this implementation is a unit independent of the processor, and is dedicated to the cryptographic, the MAC, or the MAC verification operation. Performance is further optimized.

According to any one of the tenth or eleventh possible implementation of the first aspect, in a twelfth possible implementation of the first aspect, the second security software application can be suspended by the processor for multiple times and is migrated from the first random access memory to the storage device by the processor each time the second security software application is suspended, and different keys are used to perform encryption or decryption on the second security software application each time the second security software application is suspended. Even for a same security software application, keys required for performing encryption or decryption on related temporary data are different each time the security software application is suspended, so as to ensure security.

According to any one of the first aspect or the foregoing possible implementations, in a thirteenth possible implementation of the first aspect, the processor is further configured to: when it is required to run the second security software application, receive a user instruction sent by the at least one central processing unit, so as to activate running of the second security software application, where the user instruction is triggered by an operation command delivered through a user interface (UI) of the general-purpose operating system software.

According to any one of the first aspect or the foregoing possible implementations, in a fourteenth possible implementation of the first aspect, the at least one security software application includes: at least one of a mobile payment software application or a subscriber identity module SIM card software application. Optionally, the apparatus may further include a SIM card or a near field communication (NFC) unit. The NFC unit is configured to exchange data related to mobile payment with an external device. Optionally, the SIM card software application includes but is not limited to a virtual SIM software or SIM feature software application customized by a communications operator.

According to any one of the first aspect or the foregoing possible implementations, in a fifteenth possible implementation of the first aspect, security isolation exists between the general-purpose operating system software run by the at least one central processing unit and the secure element. Optionally, the security isolation is used to prevent the general-purpose operating system software run by the at least one central processing unit or a common software application based on the general-purpose operating system software from accessing the secure element or the first random access memory. The prevention includes prohibiting at least one of data writing, data reading, or data modification.

Optionally, the apparatus may further include a non-power-loss volatile memory, for example, a read-only memory, configured to store a data result generated by the at least one central processing unit or the secure element.

Optionally, the secure element further includes a non-power-loss volatile memory, for example, a read-only memory, configured to store secure operating system software, so that the processor can read the secure operating system software from the read-only memory and run the secure operating system software.

Optionally, each component in the apparatus is hardware, and each component includes multiple transistors or logic gate circuits.

According to a second aspect, an embodiment of the present application provides a method for controlling running of multiple security software applications. The method includes: running, by at least one central processing unit, general-purpose operating system software; running, by a processor in a secure element, secure operating system software and at least one security software application based on the secure operating system software; temporarily storing, by a first random access memory in the secure element, secure temporary data generated during running of the secure operating system software and the at least one security software application; when it is required to run a second security software application, suspending, by the processor, running of first security software application in the at least one security software application, migrating first temporary data generated during running of the first security software application from the first random access memory to a storage device disposed outside the secure element, and based on the secure operating system software, running the second security software application; and temporarily storing, by the first random access memory, second temporary data generated during running of the second security software application.

Optionally, the second security software application is a security software application that is ever suspended by the processor and is run again; and the method further includes: when the second security software application is suspended, migrating, by the processor, the second temporary data from the first random access memory to the storage device; and when it is required to run the second security software application again, migrating, by the processor, the second temporary data from the storage device back to the first random access memory.

Optionally, each of the at least one security software application or the second security software application occupies a preset space resource (or referred to as a channel) in the storage device.

According to a third aspect, an embodiment of the present application provides a semiconductor chip for controlling running of multiple security software applications. The semiconductor chip includes a secure element and at least one central processing unit coupled to the secure element; the secure element includes a processor and a first random access memory; the at least one central processing unit is configured to: run general-purpose operating system software, and communicate with the secure element under an action of the general-purpose operating system software; the processor is configured to run secure operating system software and at least one security software application based on the secure operating system software; the first random access memory is configured to temporarily store secure temporary data generated during running of the secure operating system software and the at least one security software application; and the processor is further configured to: suspend running of a first security software application in the at least one security software application, control migrating first temporary data generated during running of the first security software application from the first random access memory to a storage device disposed outside the semiconductor chip, and based on the secure operating system software, run the second security software application, where second temporary data generated during running of the second security software application is temporarily stored in the first random access memory.

Optionally, each of the at least one security software application or the second security software application occupies a preset space resource (or referred to as a channel) in the storage device.

According to a fourth aspect, an embodiment of the present application provides a computer program. The computer program is used to drive a processor to perform the following process: run secure operating system software and at least one security software application based on the secure operating system software that are included in the computer program; and when it is required to run a second security software application included in the computer program, suspend running of a first security software application in the at least one security software application, control migrating first temporary data generated during running of the first security software application from a first random access memory corresponding to the processor to a storage device disposed outside a secure element in which the processor is located, and based on the secure operating system software, run the second security software application, where second temporary data generated during running of the second security software application is temporarily stored in the first random access memory. The secure element includes: the processor and the first random access memory. Optionally, security isolation exists between the secure element and at least one central processing unit that runs general-purpose operating system software. The first random access memory is configured to temporarily store secure temporary data generated during running of the secure operating system software and the at least one security software application.

Optionally, the computer program may further include the general-purpose operating system software, and is used to drive the at least one central processing unit to run.

Optionally, the security isolation is used to prevent the general-purpose operating system software run by the at least one central processing unit or a common software application based on the general-purpose operating system software from accessing the secure element or the first random access memory. The prevention includes prohibiting at least one of data writing, data reading, or data modification.

According to a fifth aspect, an embodiment of the present application provides a computer readable storage medium, and the computer readable storage medium stores the computer program described in the fourth aspect.

According to a sixth aspect, an embodiment of the present application provides a secure element. The secure element includes a processor and a first random access memory. The processor is configured to run secure operating system software and at least one security software application based on the secure operating system software; the first random access memory is configured to temporarily store secure temporary data generated during running of the secure operating system software and the at least one security software application; and the processor is further configured to: suspend running of a first security software application in the at least one security software application, control migrating first temporary data generated during running of the first security software application from the first random access memory to a storage device disposed outside the secure element, and based on the secure operating system software, run second a security software application, where second temporary data generated during running of the second security software application is temporarily stored in the first random access memory.

According to the technical solutions provided in the embodiments of the present application, in a case of ensuring running security of a security application program, costs and an area of hardware implementation of the secure element can be reduced, so as to better adapt to a demand for miniaturization of a portable electronic device.

BRIEF DESCRIPTION OF THE DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments of the present application or the prior art, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
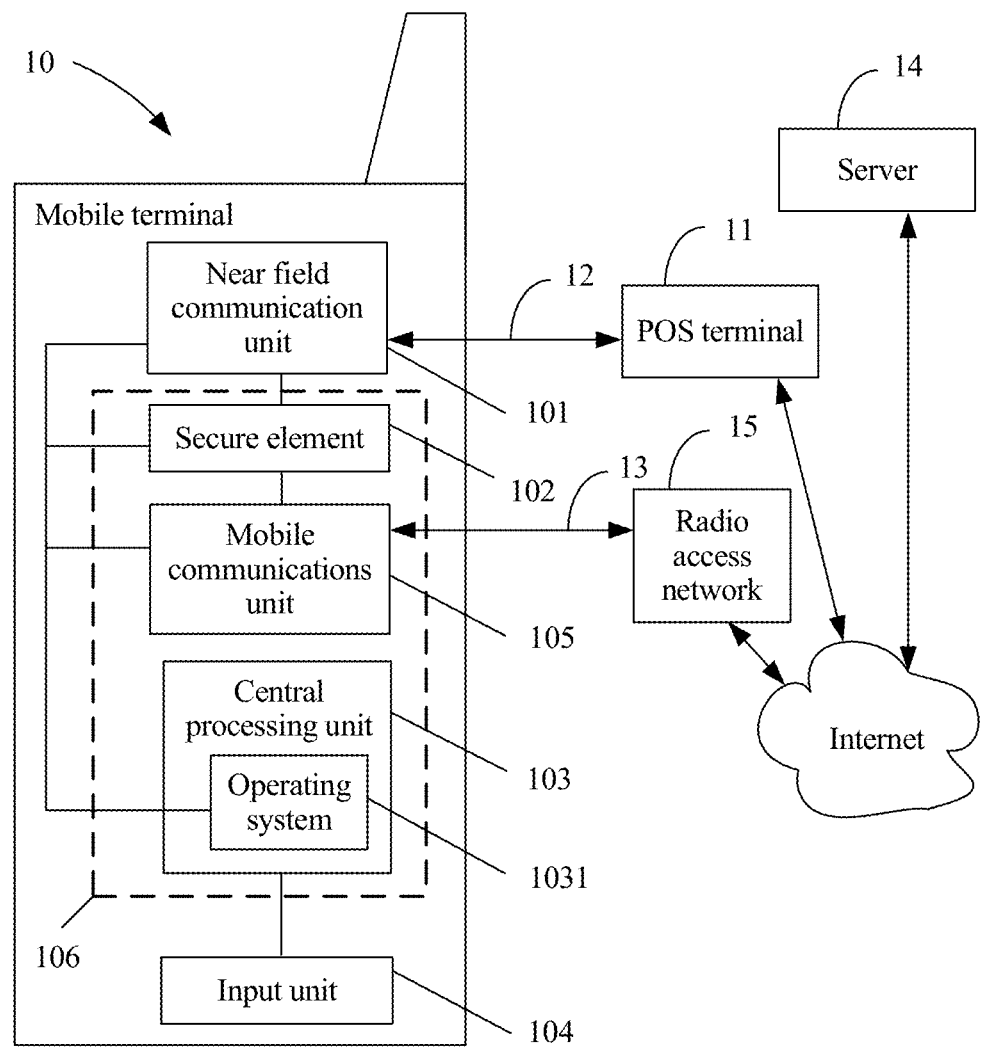
FIG. 1 is a simplified schematic diagram of a simplified structure of a mobile terminal used to run a secure mobile payment software application in a mobile payment scenario in the prior art.
Figure 2:
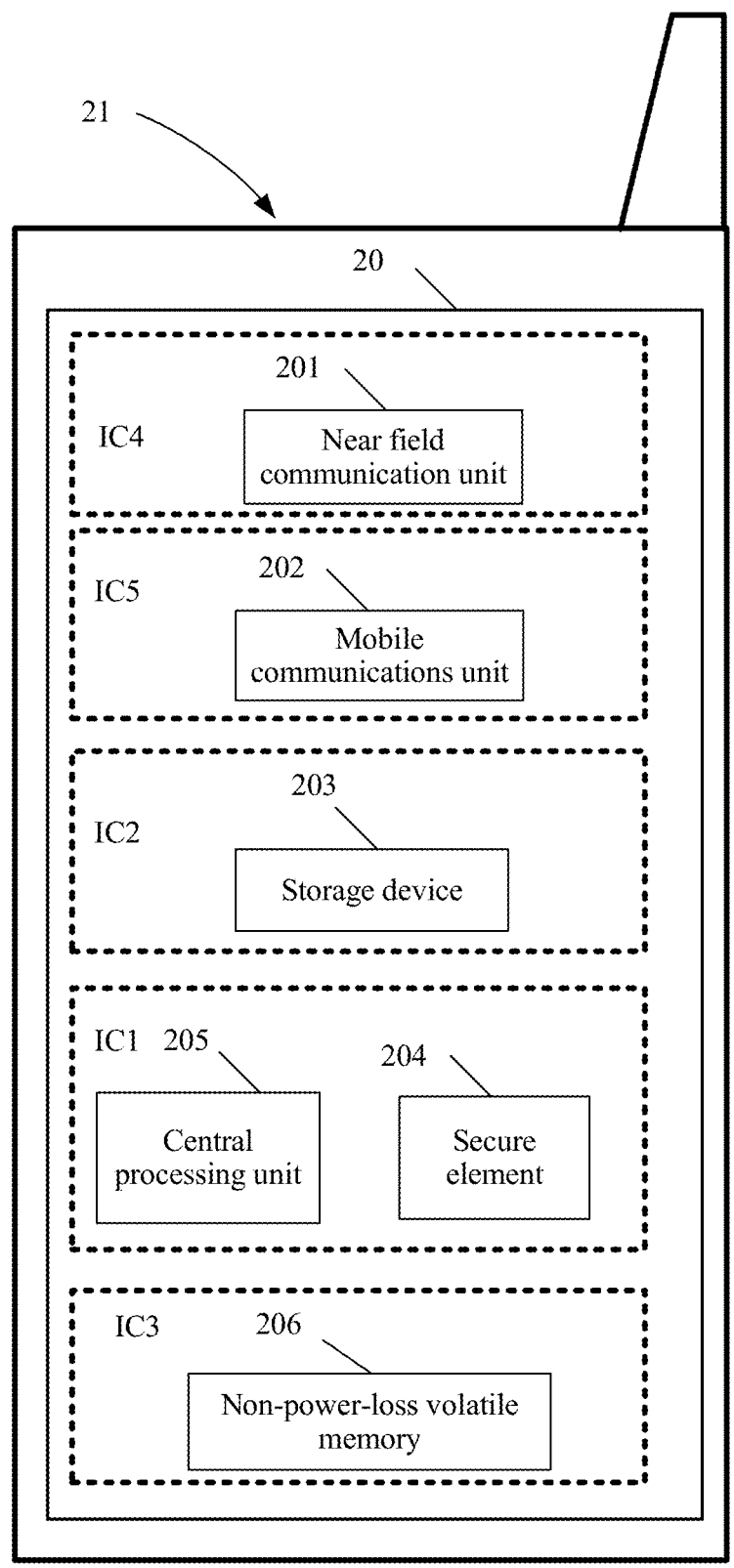
FIG. 2 is a simplified schematic diagram of a structure of a mobile payment apparatus according to an embodiment of the present application.

FIG. 2 is a simplified schematic structural diagram of a mobile payment apparatus 20 according to an embodiment of the present application. The mobile payment apparatus 20 may be located in a mobile terminal 21. The mobile terminal 21 may be user equipment (UE), such as various portable terminal devices: a mobile phone, a tablet computer, a wearable device, or the like. The mobile payment apparatus 20 may be specifically a chip, a chip set, or a circuit board that carries a chip or a chip set. The chip, the chip set, or the circuit board that carries a chip or a chip set may operate under an action of necessary software. The mobile payment apparatus 20 may include a near field communication unit 201. The near field communication unit 201 exchanges, by running a short-range wireless communication protocol, payment information with a payment terminal such as a POS terminal that is used to access the Internet to implement a mobile payment function and that is located outside the mobile terminal 21, so as to implement offline payment. A mobile communications unit 202 exchanges payment information with a radio access network, specifically, such as a base station in the radio access network by running a cellular radio communication protocol, so as to access the Internet by using the radio access network that includes the base station. Eventually, the mobile communications unit 202 exchanges the payment information with a server that has a payment function and that is in the Internet, so as to implement online payment. It can be understood that the mobile payment apparatus 20 may include one of the near field communication unit 201 or the mobile communications unit 202, so as to implement any one of offline payment or online payment. A radio frequency identification (RFID) technology may be used in the short-range wireless communication protocol run by the near field communication unit 201. Specifically, various types of RFID protocols may be supported, such as a European Computer Manufacturers Association (ECMA) standard protocol, and another type of short-range communication protocol such as Bluetooth communications, infrared communications, and a Wireless Fidelity (WiFi) protocol may be included. The cellular radio communication protocol run by the mobile communications unit 202 may be any one or more cellular radio communication protocols such as GSM, UMTS, WiMAX, or LTE, so as to implement communication with the radio access network in a cellular mobile communications network by using the mobile communications unit 202. The mobile communications unit 202 may read SIM card (not shown in the figure) information included in the mobile terminal 21 or the mobile payment apparatus 20, so as to implement registration and authentication of the cellular mobile communications network. It can be understood that a base station in a radio access network is a network element that implements the foregoing communication function and that is in the radio access network. The base station may have multiple forms, for example, a NodeB, an eNodeB, and the like. The radio access network that includes the base station is eventually connected to a server in a network, that is, a server on a cloud side, so as to implement a payment information exchange between the server and the mobile payment apparatus 20. The near field communication unit 201 or the mobile communications unit 202 may include a baseband unit that runs a communication protocol. Optionally, the near field communication unit 201 or the mobile communications unit 202 may further include a radio frequency unit. The radio frequency unit may be configured to receive a radio frequency signal, and convert the radio frequency signal into a baseband signal for processing by the baseband unit. The payment information may be included in the radio frequency signal, so as to be obtained by the near field communication unit 201 or the mobile communications unit 202.

The mobile payment apparatus 20 in FIG. 2 further includes a storage device 203, a secure element 204, and at least one central processing unit 205. The at least one central processing unit 205 is a general-purpose central processing unit, configured to run general-purpose operating system software such as an Android operating system, a Windows operating system, or an iOS operating system. These operating systems can be used to support a common non-security software application. A larger quantity of central processing units 205 indicates a higher data processing capability. The general-purpose operating system software is a general-purpose software platform running a variety of common software applications. The general-purpose central processing unit 205 may be implemented based on an ARM architecture, an Intel X86 architecture, a Million Instructions Per Second (MIPS) architecture, or the like. This is not limited in this embodiment. The general-purpose central processing unit 205 controls the near field communication unit 201, the mobile communications unit 202, the storage device 203, and the secure element 204 under the action of the general-purpose operating system software. A specific control process may include: controlling enabling, controlling disabling, or controlling entering or exiting a low power-consuming state. Therefore, the central processing unit 205 that runs the general-purpose operating system can implement central control over other parts in the mobile payment apparatus 20, so that these parts are normally powered on/off, enter or exit a low power-consuming state, for example, enter or exit a sleep state. Power consumption of any component of the near field communication unit 201, the mobile communications unit 202, the storage device 203, or the secure element 204 in a low power-consuming state is lower than power consumption of the component during normal operation. In addition, the control process for any component may further include another control operation, for example, controlling an operating state. Controlling an operating state may be adjusting an operating voltage, a clock rate, or an information processing rate of the component during operation. This is not limited in this embodiment. For a specific control process, refer to a control operation performed on another component by a general-purpose central processing unit in the prior art.

In FIG. 2, the secure element 204 and the at least one central processing unit 205 are located in a first semiconductor chip IC1 in the mobile payment apparatus 20. The IC1 is also referred to as a master chip of the mobile payment apparatus 20. The secure element 204 and the at least one central processing unit 205 are integrated into the same semiconductor master chip IC1. In this way, costs and an area of mobile payment hardware are reduced. The storage device 203 is located in a second semiconductor chip IC2. The storage device 203 may store intermediate data or temporary data generated during running of the at least one central processing unit 205 or the secure element 204. Therefore, the storage device 203 may be a power-loss volatile storage device such as an SRAM, a DRAM, an SDRAM, or another random access memory. In addition, a DDR SDRAM is preferred. As shown in FIG. 2, the mobile payment apparatus 20 further includes a non-power-loss volatile memory 206. The non-power-loss volatile memory 206 is located in a third semiconductor chip IC3 in the mobile payment apparatus 20. The non-power-loss volatile memory 206 is configured to store a data result generated by the at least one central processing unit 205 or the secure element 204. The non-power-loss volatile memory 206 may be a replay protected memory block (RPMB) memory. Different from intermediate data or temporary data, a data result can be saved for a long time. On the contrary, temporary data, intermediate data, or memory data is process data generated during running of software. The process data does not need to be saved for a long time, and may be lost as a device or an apparatus meets a power loss. The temporary data includes but is not limited to temporary data generated during running of an operating system and temporary data generated during running of a software application. The temporary data may specifically include various intermediate operation result data or configuration data generated during running of an algorithm or a process.

In embodiments of the present application, starting a software application indicates that the software application is changed from an end state to a start state. For the software application in an end state, a random access memory or a memory does not retain intermediate data or temporary data of the software. The software application in a start state may include a suspended state and a running state. A related algorithm and process of a software application in a suspended state are not operated or performed any more, but are in a wait state. In this case, related temporary data does not change. If the software application is in a running state, it indicates that an algorithm or a process of the software is being operated or performed, and based on the running algorithm or process, new temporary data or intermediate data is generated.

Optionally, as shown in FIG. 2, the near field communication unit 201 may be located in another fourth semiconductor chip IC4 in the mobile payment apparatus 20. It can be understood that the near field communication unit 201 is implemented by using the fourth semiconductor chip IC4 shown in FIG. 2. In addition, the near field communication unit 201 may also be located in the first semiconductor chip IC1 (not shown in the figure), so as to further improve an integration level of the master chip IC1, and reduce implementation costs. Similarly, the mobile communications unit 202 may be independently located in another fifth semiconductor chip IC5 in the mobile payment apparatus 20 as shown in FIG. 2 or may be located in the first semiconductor chip IC1. Whether the near field communication unit 201 or the mobile communications unit 202 is integrated into the master chip IC1 depends on a specific design of a person skilled in the art.

In the embodiments of the present application, a semiconductor chip is also referred to as a chip for short and may be a set of integrated circuits manufactured on an integrated circuit substrate (which is usually semiconductor materials such as silicon) by using the integrated circuit technology. An outer layer of the semiconductor chip is usually encapsulated by using semiconductor encapsulation materials. The integrated circuit may include a transistor such as a logic gate circuit, a metal oxide semiconductor (MOS) transistor, a bipolar transistor, or a diode. The semiconductor chip may work independently or work under an action of necessary software, to implement various functions such as communication, operating, or storage. Therefore, each component of the apparatus mentioned in this embodiment of the present application may be hardware, and each component may include multiple logical gate circuits or transistors.

Figure 3:
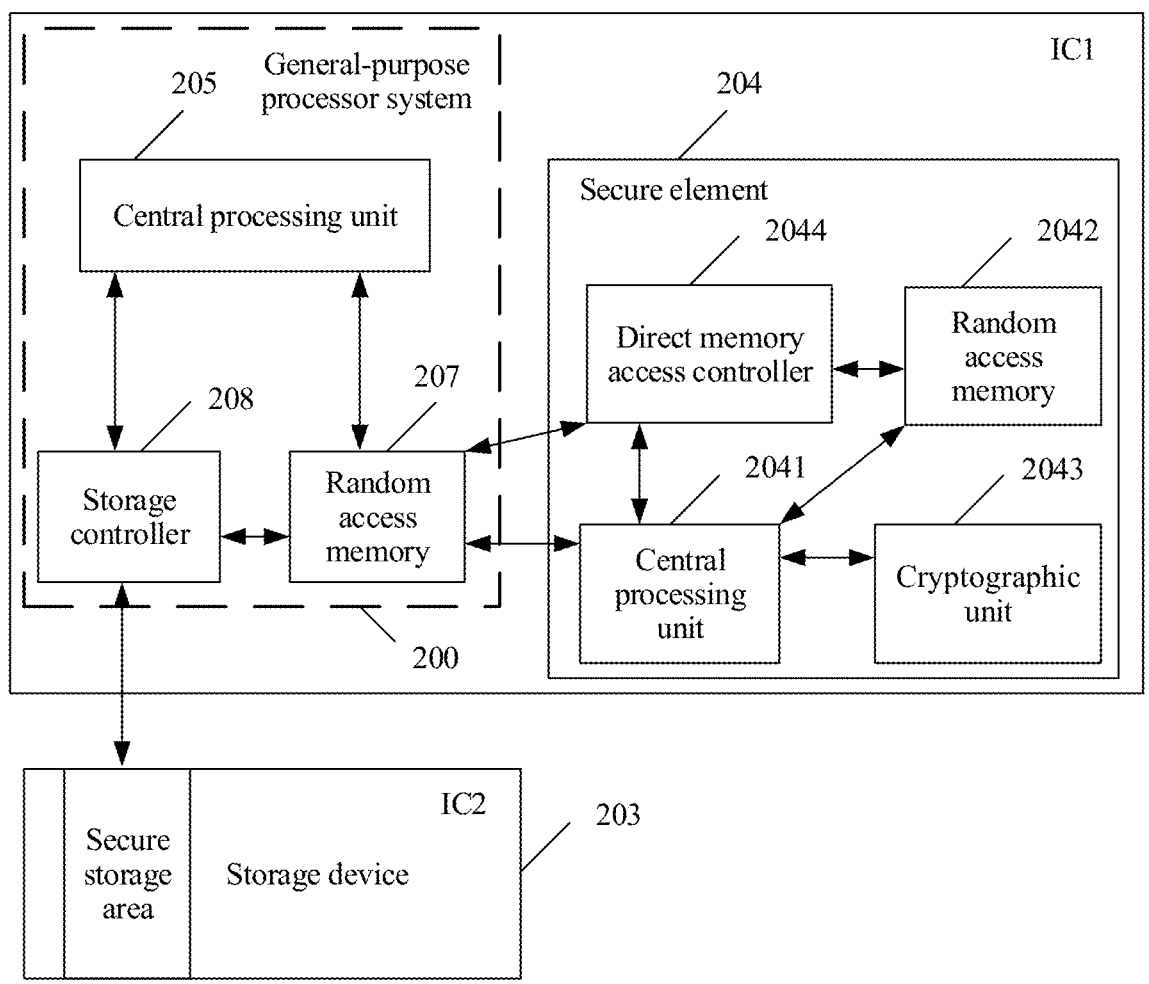
FIG. 3 is a simplified schematic diagram of a structure of a mobile payment apparatus for controlling running of multiple security software applications according to an embodiment of the present application.

As an elaboration of some content in FIG. 2, FIG. 3 is a simplified schematic structural diagram of a mobile payment apparatus that includes a first semiconductor chip IC1 and a second semiconductor chip IC2 and that can control running of multiple security software applications including one or more mobile payment software applications according to an embodiment of the present application. The first semiconductor chip IC1 includes: a secure element 204 and one or more general-purpose central processing units 205 coupled to the secure element 204. The secure element 204 includes: a central processing unit 2041 and a random access memory 2042. The general-purpose central processing unit 205 may be, for example, an ARM processor, configured to run general-purpose operating system software such as an Android system, and communicate with the secure element 204 under an action of the general-purpose operating system software. The central processing unit 2041 is configured to run secure operating system software and at least one security software application based on the secure operating system software. The random access memory 2042 is configured to temporarily store secure temporary data generated during running of the secure operating system software and the at least one security software application. When it is required to run a second security software application, the central processing unit 2041 is further configured to suspend running of a first security software application in the at least one security software application, control migrating first temporary data generated during running of the first security software application from the random access memory 2042 to a storage device 203 located in the second semiconductor chip, and continuously run the second security software application by using the random access memory 2042. The at least one security software application and the second security software application mentioned in this embodiment may include at least one of the previously mentioned mobile payment software application or the subscriber identity module SIM card software application. The SIM card software application includes but is not limited to a virtual SIM software or SIM feature software application customized by a communications operator. Therefore, although the apparatus 20 is described by mainly using mobile payment as an application scenario in this embodiment, actually, the apparatus 20 not only can support a mobile payment function, but also can meet another type of security requirement of the mobile terminal 21. Therefore, the mobile payment apparatus 20 in this embodiment should be understood as a mobile security apparatus in a broad sense.

Optionally, when the general-purpose central processing unit 205 communicates with the secure element 204, the general-purpose central processing unit 205 can control running of the secure element 204. The control of running of the secure element 204 may include at least one of enabling the secure element 204, disabling the secure element 204, controlling the secure element 204 to enter a low power-consuming state, and adjusting an operating voltage, an operating current, or a clock rate of the secure element 204. The communication between the general-purpose central processing unit 205 and the secure element 204 may follow an IPC protocol.

In this embodiment, security isolation exists between the general-purpose operating system software run by the general-purpose central processing unit 205 and the secure element 204. In this disclosure, the security isolation means preventing access to the secure element 204. Therefore, the security isolation can be understood as an access right control means between systems. That security isolation exists between the general-purpose operating system software run by the general-purpose central processing unit 205 and the secure element 204 means that the general-purpose operating system software run by the general-purpose central processing unit 205 or a common software application based on the general-purpose operating system software is prevented from accessing the secure element 204 or the random access memory 2042 therein. Alternatively, due to impact of the security isolation, the general-purpose operating system software or the common software application cannot access the secure element 204 or the random access memory 2042. If there are multiple common software applications based on the general-purpose operating system software, at least some software applications of the common software applications are prevented from accessing the secure element 204. For example, the general-purpose operating system software run by the general-purpose central processing unit 205 or at least one common software application based on the general-purpose operating system software cannot read or modify data being executed by the secure element 204 or data temporarily stored by the random access memory 2042, and cannot write data to the random access memory 2042, so as to implement security.

In this embodiment, the central processing unit 2041 can suspend at least some running security software applications, so that at least some memory space of the random access memory 2042 is partially saved and used to run the second security software application. The central processing unit 2041 replaces some running security software applications with security software applications that need to be run, and migrates temporary data generated during running of the replaced security software applications to an external storage device, so as to avoid occupying more memory space of the random access memory 2042. In this way, there is no need to design extremely large memory space of the first random access memory, thereby reducing an area and costs of the secure element. The solution is particularly applicable to a mobile payment field. Unlike the general-purpose central processing unit 205, the secure element 204 is a processing device dedicated to processing a security software application. Therefore, controlling a size and costs of the secure element 204 is relatively important. This embodiment of the present application can resolve a related problem well.

Specifically, the random access memory 2042 may be an SRAM (static random access memory), a DRAM (dynamic random access memory), or an SDRAM (synchronous dynamic random access memory). The storage device 203 located in the second semiconductor chip IC2 is also usually a random access memory, and may be an SRAM (static random access memory), a DRAM (dynamic random access memory), or an SDRAM (synchronous dynamic random access memory). Preferably, the storage device 203 is a DDR SDRAM (double data rate synchronous dynamic random access memory). Because the storage device 203 is a random access memory, a speed of migrating data from the random access memory 2042 to the storage device 203 or migrating data from the storage device 203 back to the random access memory 2042 is extremely high. Any software in multiple security software applications can be suspended or rerun at any time in this flexible migrate-in and migrate-out manner. This is convenient and flexible. There is no need to restart a security software application each time the security software application needs to be run, and there is no need to maintain excessive temporary data in the secure element 204, thereby reducing costs and an area of the secure element 204.

The second security software application may be a security software application that is newly started or software that is previously suspended. When it is required to run the second security software application, the central processing unit 2041 receives a user instruction sent by the general-purpose central processing unit 205 to activate running of the second security software application. The user instruction is triggered by an operation command delivered through a user interface (UI) based on the general-purpose operating system software. The user interface may include a user interface based on a touchscreen, a keyboard, a mouse, or another input manner, and may detect any form of information input of a user based on the user interface. The central processing unit 2041 in the secure element 204 and the general-purpose central processing unit 205 may perform instruction communication, or may implement data exchange by using an IPC rule or protocol. Data exchange may be implemented by using a random access memory 207 in FIG. 3. A function of the random access memory 207 is subsequently described in detail. The IPC protocol may follow an existing interprocess communication protocol. Details are not described in this embodiment.

If the second security software application is a security software application that is ever suspended by the central processing unit 2041 and is run again, when the second security software application is suspended, second temporary data corresponding to the second security software application is migrated from the random access memory 2042 to the storage device 203 by the central processing unit 2041. When it is required to run the second security software application again, the central processing unit 2041 is configured to migrate the second temporary data from the storage device 203 back to the random access memory 2042. Therefore, the second security software application may be suspended for multiple times, and related temporary data is transmitted between the random access memory 2042 and the storage device 203 each time the second security software application is suspended, rerun, or loaded onto the secure element 204. Therefore, the secure element 204 can run only one security software application at one moment, and stores temporary data of another suspended security software application in the storage device 203. This reduces memory consumption of the random access memory 2042 as much as possible, so that storage space of the random access memory 2042 does not need to be designed to be extremely large, thereby reducing areas and costs of the random access memory 2042 and the secure element.

Optionally, the central processing unit 2041 may be configured to implement at least some security functions. For example, when it is required to suspend the second security software application, the central processing unit 2041 is further configured to: obtain the second temporary data of the second security software application from the random access memory 2042, and before migrating the second temporary data to the storage device 203, perform at least one security processing of encryption or a MAC operation on the second temporary data, so as to improve security. When it is required to run or rerun the second security software application again, the central processing unit 2041 is further configured to: obtain the second temporary data from the storage device 203, and before migrating the second temporary data back to the random access memory 2042, perform at least one security processing of decryption or a MAC verification operation on the second temporary data. Only the second temporary data on which the decryption or the MAC verification operation is performed can to be used continuously. In this embodiment, an embodiment of the MAC operation is performing a hash operation. Correspondingly, performing the MAC verification operation may be performing a hash verification operation. The MAC operation or the MAC verification operation processing is described by mainly using the hash or hash verification operation as an example in a subsequent solution in this embodiment. It can be understood that multiple algorithms used to authenticate the used MAC operation or MAC verification operation processing are provided in the prior art. Details of these algorithms are not described in this embodiment.

In an alternative implementation, as shown in FIG. 3, the secure element 204 further includes a cryptographic unit 2043. The cryptographic unit 2043 is configured to perform a security function such as security operation processing including cryptographic, MAC, or MAC verification. Unlike the former implementation in which secure operation processing is directly performed by using the central processing unit 2041, the cryptographic unit 2043 in this implementation is a unit that is independent of the central processing unit 2041, and is dedicated to the secure operation such as cryptographic, MAC, or MAC verification. Performance is further optimized. Specifically, before migrating the second temporary data to the storage device 203, the central processing unit 2041 may provide the second temporary data for the cryptographic unit 2043, and receive the second temporary data after secure processing of the cryptographic unit 2043. Before migrating the second temporary data back to the random access memory 2042, the central processing unit 2041 may provide the second temporary data for the cryptographic unit 2043, and receive the second temporary data after reverse security processing of the cryptographic unit 2043. The security processing performed by the cryptographic unit 2043 includes at least one of encryption or a MAC operation. The performed reverse security processing includes at least one of decryption or a MAC verification operation.

In another alternative implementation, as shown in FIG. 3, the secure element 204 further includes a DMA (direct memory access) controller 2044, configured to control implementation of data migration between the random access memory 2042 and the storage device 203. The DMA controller 2044 is a component that is independent of the central processing unit 2041, and is dedicated to migrating temporary data in the secure element 204 to another external device or an interface, and the central processing unit 2041 does not need a corresponding data migration function. In this case, the central processing unit 2041 only needs to run and process a security software application, and the data migration is implemented by the DMA controller 2044. Optionally, the central processing unit 2041, the cryptographic unit 2043, and the DMA controller 2044 in the secure element 204 can be considered as a whole, that is, a processor that performs a processing operation function. The random access memory 2042 is used as a memory of the processor. When needing to suspend running of a security software application A, the central processing unit 2041 may trigger migration of temporary data of the security software application A that is temporarily stored in the random access memory 2042. Specifically, the central processing unit 2041 may send a trigger signal or an interrupt signal to the DMA controller 2044. Triggered by the trigger signal or the interrupt signal, the DMA controller 2044 migrates the temporary data from the random access memory 2042 to the storage device 203. After the migration is completed, the central processing unit 2041 may run another security software application B by using released or saved storage space in the random access memory 2042 due to the migration.

When temporary data of one or more security software applications is migrated to the storage device 203, corresponding temporary data may be stored in a secure storage area of the storage device 203. The secure storage area is dedicated to temporarily storing the temporary data of the one or more security software applications that are temporarily suspended by the central processing unit 2041. Because the storage device 203 can be shared by the secure element 204 and the general-purpose central processing unit 205, the storage device 203 can store both temporary data or intermediate data generated by the general-purpose central processing unit 205 and temporary data generated by the secure element 204. Dedicated space or a dedicated area is divided from the storage device 203, so as to implement isolation between the temporary data generated by the general-purpose central processing unit 205 and the temporary data in the secure element 204, thereby improving security. The isolated secure storage area cannot be accessed by the general-purpose operating system software run by the general-purpose central processing unit 205 or the common software application based on the general-purpose operating system software. Optionally, the general-purpose central processing unit 205 may access the secure storage area in a trusted execution environment (TEE), so as to implement data migration-in or migration-out of the secure storage area. Security isolation may exist between the trusted execution environment performed by the central processing unit 205 and the general-purpose operating system software (such as an Android system environment) also run by the central processing unit 205. The two independent software operating systems are provided. Although the two independent software operating systems are run by the same central processing unit 205, due to security isolation, a running program of the general-purpose operating system software or the common software application based on the general-purpose operating system software cannot access the trusted execution environment.

Generally, the storage device 203 is a DDR SDRAM. Storage space of the storage device 203 is extremely large. A secure storage area especially divided from the storage device 203 may be much larger than the random access memory 2042 in the secure element 204. Therefore, an apparatus or a device for controlling running of a security software application provided in this embodiment may support starting of an extremely large number of security software applications. When multiple security software applications are started, for example, SIM card software applications of one hundred operators or one hundred bank card payment software applications are simultaneously started, in this case, the secure element 204 of the apparatus or the device can still operate normally because the central processing unit 2041 in the secure element 204 runs only security software application of a maximum preset number (one is preferred) at one moment, and the other security software application is suspended and corresponding temporary data is stored in the secure storage area of the storage device 203. This implements dynamic suspension and recovery of the multiple security software applications and dynamic migration-in or migration-out of related temporary data, thereby reducing costs and an area of the secure element 204.

When it is required to end a third security software application in the one or more security software applications that are temporarily suspended by the central processing unit 2041, the central processing unit 2041 is further configured to control the storage device 203 to delete temporary data generated during running of the security software application that needs to be ended.

Optionally, if the second security software application is suspended and rerun by the central processing unit 2041 for multiple times, and is transmitted between the storage device 203 and the random access memory 2042 for multiple times, the central processing unit 2041 or the cryptographic unit 2043 uses different keys to perform encryption or decryption on the second security software application each time the second security software application is suspended, so as to ensure security.

Optionally, the secure element 204 further includes a non-power-loss volatile memory (not shown in the figure), for example, a read-only memory, configured to store secure operating system software, so that the central processing unit 2041 can read the secure operating system software from the read-only memory and run the secure operating system software. The secure operating system software may be a chip operating system (COS). The COS is also referred to as a COS mirror, and may be equivalent to operating system software in a resident smart card or in a financial integrated circuit (IC) card. In this case, it is equivalent that the secure element 204 has a function of the resident smart card, or a function of the financial card, and is configured to provide an external POS terminal, an external card reader, or an external financial server on a cloud side with data required by a mobile payment service like card swiping, such as data related to a bank financial service or personal account data of a user, for example, a personal account, a password, or a variety of verification information required by a bank server to verify a personal account. In addition, the COS mirror is also an operating platform for receiving and processing external payment information such as various payment information sent to the secure element 204 from the financial server, the card reader, or the POS terminal, and may be used to execute various instructions sent from the outside. Certainly, in addition to mobile security payment, the platform may support another security software application, for example, a SIM card software application.

It should be noted that mobile payment in this embodiment is a definition in a broad sense, and not only includes commercial and financial mobile payment services, but also includes other types of payment services such as public transportation, an identity card, and a social security card. That is, by means of mobile payment, a mobile terminal may be connected to a communications peer to exchange payment information with a server eventually, and implement data transaction, data exchange, or data settlement related to one or more accounts in the mobile terminal. A unit of the data transaction, the data exchange, or the data settlement not only may include a currency, but also may be another unit such as a virtual currency, various bonus points, or a credit limit that can be used to implement payment, exchange, or transaction settlement. This is not limited in this embodiment. The account includes but is not limited to a personal account, a group account, or an organization account. Compared with a payment behavior implemented only on a fixed terminal, implementation of mobile payment is more flexible, and mobile payment is executed by a mobile terminal. Therefore, a requirement for making a payment anytime anywhere can be satisfied better.

It can be understood that the foregoing embodiment of the present application is described by mainly using a mobile payment environment as an example. Actually, the secure element 204 may run various security software applications that may include various customized software applications with a high security level, and are not limited to the mobile payment software application or the software related to the SIM card. Therefore, the security software application may be different from the common software application. The security software application can run only in the secure element 204, and is isolated from the general-purpose operating system software or environment. In this embodiment, a security level of the secure operating system software is higher than that of the general-purpose operating system software. A security level of the security software application based on the secure operating system software is higher than that of the common software application based on the general-purpose operating system software. The two operating systems are isolated, so as to ensure that a secure operating system software environment is not randomly accessed by the general-purpose operating system software or the common software application run by the general-purpose central processing unit 205.

It should be noted that there may be multiple general-purpose central processing units 205 in this embodiment of the present application. Data exchange between the multiple general-purpose central processing units 205 and another component in the mobile payment apparatus 20 such as the secure element 204 may mean that any one or more of the multiple general-purpose central processing units 205 exchange data with the another component. When the mobile payment apparatus 20 is in an operating state, all or some of the multiple central processing units 205 may be enabled.

In addition, the mobile payment apparatus 20 may further include a graphics processing unit (GPU), an audio processing unit, a power management unit (PMU), a global positioning system (GPS), or the like. The GPU may also be located in the master chip IC1. Furthermore, in addition to the mobile payment apparatus 20 that mainly includes various circuits, the mobile terminal 21 may include a touchscreen used for input, a display, and another necessary sensor, for example, a gravity accelerometer, a gyroscope, a light sensor, or the like. Details of these components existing in the art are not described in this embodiment.

Further referring to FIG. 3, the first semiconductor chip IC1 may further include a random access memory 207 and a storage controller 208. The general-purpose central processing unit 205, the random access memory 207, and the storage controller 208 may be included in one general-purpose processor system 200. The general-purpose processor system 200 can run based on the general-purpose operating system software and the common software application, and may selectively operate in the TEE environment. Because the general-purpose processor system 200 cannot directly access or directly read data in the secure element 204, the general-purpose processor system 200 exchanges data with the secure element 204 by using the random access memory 207, and follows the IPC protocol.

When the random access memory 2042 in the secure element 204 exchanges temporary data with the storage device 203 disposed on the second semiconductor chip IC2, for example, implements the temporary data migration previously described in this embodiment, the data migration needs to pass the random access memory 207. Specifically, the central processing unit 2041 or the DMA controller 2044 is configured to: read temporary data of a security software application that needs to be suspended from the random access memory 2042, and write the temporary data to the random access memory 207. The storage controller 208 may be a DMA controller. The DMA controller may be configured to write the temporary data of the random access memory 207 to the secure storage area of the storage device 203 in the TEE environment, so as to implement temporary data migration from the secure element 204 to the storage device 203. After the migration is completed, the temporary data may be deleted from the random access memory 2042 by the central processing unit 2041, the DMA controller 2044, or the storage controller 208. Alternatively, the general-purpose central processing unit 205 may replace the storage controller 208 to implement a function of writing related data to the secure storage area of the storage device 203. Therefore, in this embodiment of the present application, the data migration to the storage device 203 performed by the central processing unit 2041 or the DMA controller 2044 not only includes direct data migration to the storage device 203, but also includes bidirectional temporary data migration between the random access memory 2042 and the storage device 203. An interrupt instruction or an IPC protocol instruction is used to control implementation of the bidirectional temporary data migration by using a third party random access memory.

When a security software application is rerun, temporary data corresponding to the security software application is read by the general-purpose central processing unit 205 or the storage controller 208, and written to the random access memory 207. The central processing unit 2041 or the DMA controller 2044 in the secure element 204 further reads related temporary data from the random access memory 207, so that the temporary data is migrated back to the random access memory 2042. After the migration is completed, the temporary data may be deleted from the random access memory 2042 by the central processing unit 2041, the DMA controller 2044, or the storage controller 208. In a process of implementing the data migration, the random access memory 207 plays a role of data relaying or forwarding. In FIG. 3, the random access memory 207 is located in the general-purpose processor system 200. Actually, the random access memory 207 may also be located in the secure element 204. A location of the memory 207 is not limited in this embodiment.

When the secure element 204 or the central processing unit 2041 suspends or reruns a security software application, temporary data migration of the security software application may relate to instruction exchange between the secure element 204 or the central processing unit 2041 and the general-purpose processor system 200 or the general-purpose central processing unit 205. In this case, the central processing unit 2041 or the general-purpose central processing unit 205 may trigger each other to perform a corresponding migration operation by using a frequently-used interrupt instruction in the prior art. For example, the central processing unit 2041 may notify, by using an interrupt instruction, the central processing unit 205 that data that needs to be migrated has been written in the random access memory 207, so that the central processing unit 205 itself can further migrate data to the storage device 203 or can control the storage controller 208 to further migrate data to the storage device 203. Conversely, after the central processing unit 205 or the storage controller 208 writes the data of the storage device 203 in the random access memory 207, the central processing unit 205 sends an interrupt instruction to the central processing unit 2041, so as to instruct the central processing unit 2041 to complete migration. The central processing unit 2041 itself may migrate the data in the random access memory 207 to the random access memory 2042 or may control the DMA controller 2044 to migrate the data in the random access memory 207 to the random access memory 2042. Alternatively, if the interrupt instruction is not used to exchange control information, the central processing unit 2041 or the general-purpose central processing unit 205 may implement information exchange by using the common IPC protocol in the prior art, so as to cooperatively complete the migration operation. For example, the general-purpose central processing unit 205 may exchange information with the central processing unit 2041 by using the interrupt instruction or the IPC protocol, so as to notify the central processing unit 2041 that the general-purpose central processing unit 205 has implemented data migration (data is migrated to or out from the random access memory 207), and instruct the central processing unit 2041 to continue to complete remaining data migration.

Generally, it is assumed that temporary data generated during running of a security software application needs to occupy memory space of 64 KB. A concept of a channel (slot) may be introduced in this embodiment. A channel is a space resource that is required to run a software application and that is in the storage device 203. If multiple software applications are started, the general-purpose central processing unit 205 or the central processing unit 2041 may pre-allocate one channel to each software application in the storage device 203. For example, a maximum of 16 channels may be preset to be simultaneously enabled in the secure element 204. Each channel allows one security software application to run. That is, in the storage device 203, there is storage space respectively corresponding to the 16 software applications, and the storage space is used to temporarily store temporary data of related software, that is, memory data, when corresponding software is suspended. With reference to FIG. 3, further referring to FIG. 4, an embodiment of an apparatus that has security isolation and that controls running of multiple security software applications is provided. The random access memory 2042 includes space of the secure operating system program itself (COS mirror), global data space, and space occupied by the security software application. A space size of the COS mirror is usually about 300 KB. The COS mirror is the secure operating system program itself that does not include any software application. The global data space is space required by intermediate data generated during running of the COS mirror.

Figure 4:
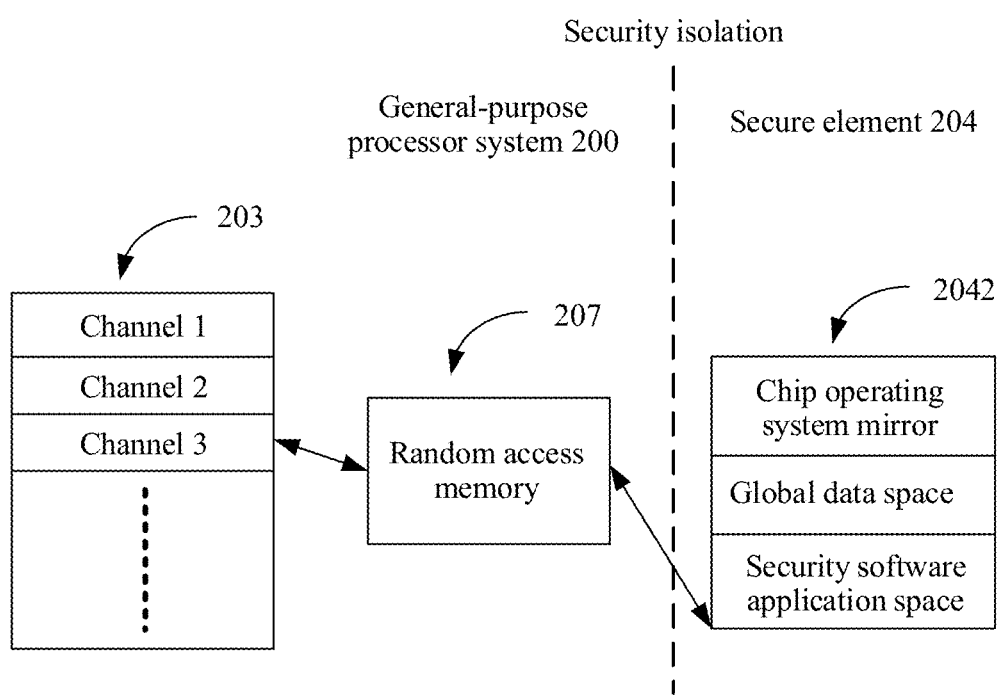
FIG. 4 is a simplified schematic diagram of an apparatus that has security isolation and that controls multiple security software applications according to an embodiment of the present application.

As shown in FIG. 4, in the storage device 203, the space occupied by the security software application includes multiple channels. Each channel contains one security software application, for example, an application A that is running on a channel 3. Only when the application A finishes running or is ended, the channel 3 can be allocated to an application B, so that temporary data of the application B that is generated when the application B is suspended can be migrated to the channel 3. In this way, it is assumed that the storage device 203 supports a maximum of 16 channels. This indicates that a maximum of 16 applications can be started. An upper limit of a quantity of started applications may be set by the secure element 204 or the general-purpose central processing unit 205. The secure element 204 or the central processing unit 2041 may parse, according to an externally input command, which application needs to be newly started or which application needs to be ended. Certainly, if there is requirement to support more channels, the general-purpose central processing unit 205 may allocate larger space in the storage device 203 as the previously mentioned secure storage area. As a relay, the random access memory 207 transmits or exchanges data between the secure element 204 and the general-purpose processor system 200 that have security isolation, so that temporary data in a security software application space in the random access memory 2042 is migrated to any channel such as the channel 3, or the data on the channel 3 is migrated back to the security software application space.

A MAC algorithm or a hash algorithm performed on data of each suspended application before the data is migrated may include an SHA256 algorithm. A hash value obtained from an operation is saved in the random access memory 2042. Subsequently, when the data is reversely migrated from the storage device 203, the saved hash value is used in hash check or hash verification. The hash verification can ensure that the data that is migrated reversely is not tampered with compared with the data before migration. If the hash verification fails or the verification fails, the cryptographic unit 2043 or the central processing unit 2041 that performs the hash verification may report an error. The error can be transmitted to the general-purpose central processing unit 205 in a form of warn information, and may be displayed on a user interface based on the general-purpose operating system.

Due to a security requirement, in addition to the hash algorithm, an encryption algorithm is applied to the to-be-migrated data. Specifically, a symmetric encryption algorithm such as an Advanced Encryption Standard algorithm (AES) 256-CBC (cipher block chaining) algorithm may be used to perform the encryption. A key used for encryption can still be saved in the random access memory 2042. The key may be randomly generated each time before the migration is performed, so as to ensure that a key used in each migration of each application is different. The key may be generated specifically by the central processing unit 2041 or another key generator (not shown in the figure). This is not limited in this embodiment.

Figure 5:
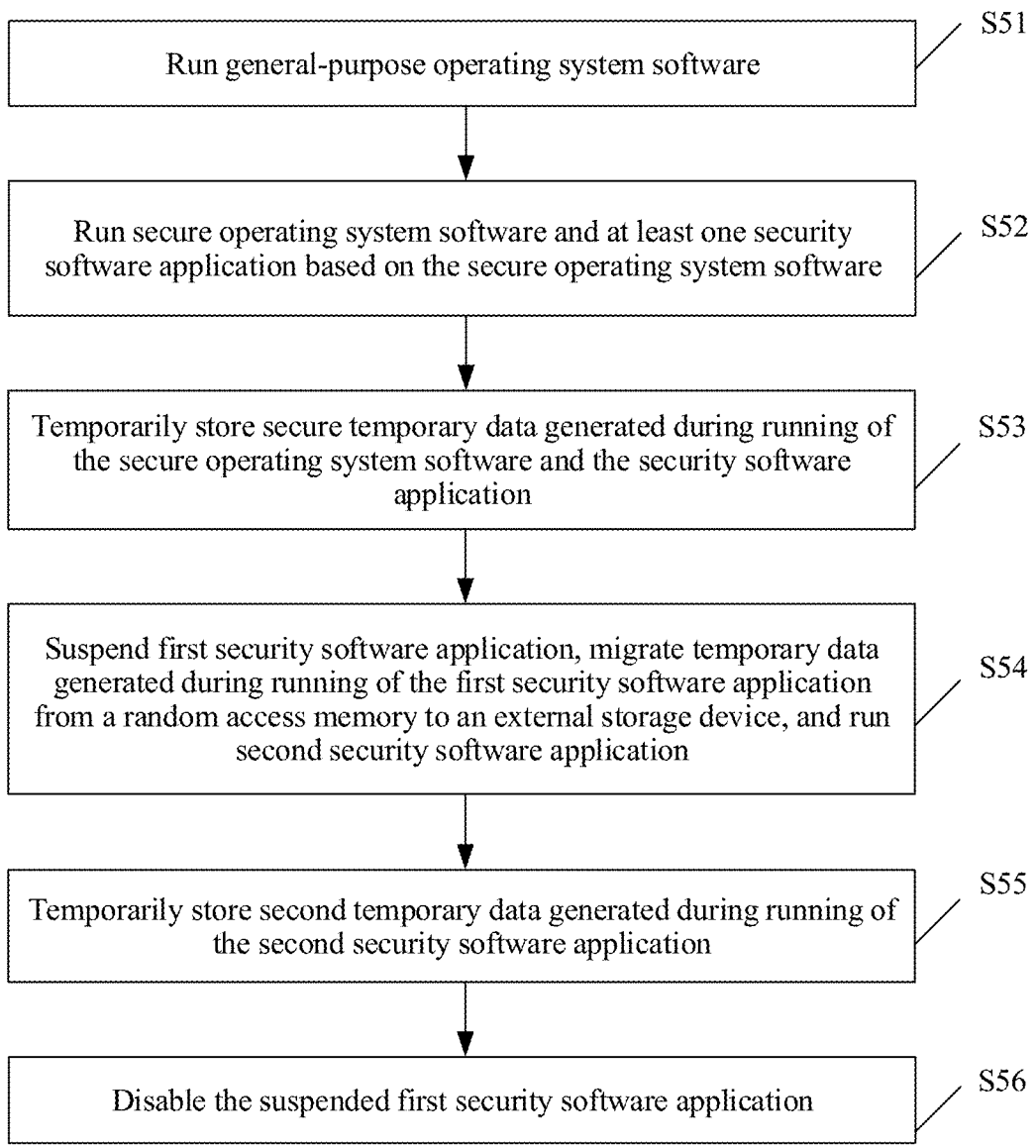
FIG. 5 is a simplified schematic flowchart of a method for controlling running of multiple security software applications according to an embodiment of the present application.

FIG. 5 is a simplified schematic flowchart of a method for controlling running of multiple security software applications according to an embodiment of the present application. The method may be performed by the mobile payment apparatus shown in FIG. 2 or FIG. 3. In S51, at least one general-purpose central processing unit 205 runs general-purpose operating system software. The general-purpose central processing unit 205 may load and run program code of the general-purpose operating system software from a non-power-loss volatile memory 206 or another non-power-loss volatile memory in a power-on program. In S52, a central processing unit 2041 in a secure element 204 runs secure operating system software and at least one security software application based on the secure operating system software. In a startup program, when the general-purpose operating system software is successfully started or being started, the secure operating system software may be started. One or more security software applications may be started by default as the secure operating system software is started, or started based on triggering of a user. The user may trigger starting of any security software application on a user interface based on the general-purpose operating system software. The triggering through the user interface is detected by the general-purpose central processing unit 205, and the general-purpose central processing unit 205 generates an instruction. The instruction is transmitted to the central processing unit 2041 in the secure element 204, so as to instruct the central processing unit 2041 to start the security software application. As described in the previous embodiment, the instruction may be an instruction based on interruption or an IPC protocol instruction.

Further, in S53, it is assumed that when a first security software application starts running, a random access memory 2042 in the secure element 204 temporarily stores secure temporary data generated during running of the secure operating system software and the security software application.

In S54, when it is required to run a second security software application, the central processing unit 2041 suspends running of the first security software application, and migrates temporary data generated during running of the first security software application from the random access memory 2042 to the storage device 203 shown in FIG. 2 or FIG. 3. For a specific migration process, refer to the previous implementation. Then the central processing unit 2041 runs the second security software application based on the secure operating system software. It is assumed that the secure element 204 or the central processing unit 2041 in the secure element 204 receives an application selection command (Select AID) from the central processing unit 205. The command is triggered by the user on the user interface, and used to select to start a new software application. The general-purpose central processing unit 205 sends an instruction (that is, the selection command) to the central processing unit 2041 based on the triggering. For example, the instruction carries instruction information (CHx) of a channel x. The information indicates that the channel x in the storage device 203 is used as a resource to newly start a software application (that is, the second security software application). The central processing unit 2041 starts the corresponding software application, and uses the random access memory 2042 in the secure element 204 as memory required for running the software application. When a new software application is run, the channel x is not used immediately, but is in an idle state. Subsequently, once the software application is suspended, the channel x is used to store temporary data of the software application. Before this, the central processing unit 2041 or a cryptographic unit 2043 performs encryption and hash algorithm processing on related temporary data of the unfinished software application (that is, the first security software application) that is running in the random access memory 2042 and that is corresponding to a channel y. Processed data is stored on the corresponding channel y in the external storage device 203. The internal random access memory 2042 may be configured to store at least one of an encryption key and a hash value, so that the encryption key or the hash value is used to perform decryption or hash verification processing when second temporary data needs to be migrated back to the random access memory 2042 subsequently.

In S55, the random access memory 2042 temporarily stores second temporary data generated during running of the second security software application. That is, space originally used for temporarily storing the temporary data of the first security software application is used to store the temporary data of the second security software application, so as to replace the running security software application.

Further, in S56, the suspended first security software application may be ended or completely stopped. For example, when a related software application on the channel y needs to be stopped, the central processing unit 2041 may receive a stop instruction sent from the general-purpose central processing unit 205. The instruction may be triggered by the user on the user interface, and may include a channel number y corresponding to the software application that needs to be stopped. The stop herein is to delete temporary data corresponding to the channel y of the storage device 203, and delete an encryption key and a hash value that are corresponding to the temporary data from the random access memory 2042.

In S54, alternatively, the second security software application may not be a newly started software application, but a software application that is previously suspended and whose related temporary data is saved on a channel z of the storage device 203. In this case, the secure element 204 or the central processing unit 2041 may receive an APDU (application protocol data unit) command sent by the general-purpose central processing unit 205 instead of a selection command. The APDU command indicates a channel number x corresponding to the second security software application that needs to resume running. If the secure element 204 or the central processing unit 2041 receives an APDU command including the channel number x, encryption and hash algorithm processing is performed on the temporary data of the running security software application corresponding to the channel y, and processed data is stored on the y channel of the external storage device 203. The random access memory 2042 still saves a corresponding encryption key and hash value. Then the temporary data of the x channel of the storage device 203 is migrated back to the secure element 204, and decryption and hash check (hash verification) are performed on the data. After the decryption and successful verification, the central processing unit 2041 runs the rerun software application by using a security software application space of the random access memory 2042.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application. In addition, the embodiments of the present application may be combined or referenced with each other. For example, for detailed implementations of some steps of the method embodiment corresponding to FIG. 5, reference may be made to the previous another embodiment.

It can be understood that one or more implementations of the present application are mainly described by describing a hardware implementation of the apparatus 20 in the previous embodiments corresponding to FIG. 1 to FIG. 4. Related functions of all or some of implementation steps corresponding to FIG. 5 may also be implemented in a form of a software function unit, and sold or used as an independent product. A related software function unit may be a computer program product, and stored in a computer readable storage medium. The computer program product may include all or some software of the general-purpose operating system software, the common software application based on the general-purpose operating system software, the secure operating system software, and at least one security software application based on the secure operating system software that are mentioned in the previous embodiments, so as to drive a related component in the apparatus 20 to implement a related processing method or function. Based on such an understanding, at least some of corresponding technical solutions of the method may be embodied in a form of a computer software product, that is, computer code. The computer code may be stored in a storage medium, and includes several instructions for instructing a computer device (which may be the previously mentioned mobile terminal, or a personal computer) to perform all or some steps of a corresponding method. The foregoing storage medium includes: any medium that can store program code, such as a USB flash drive, a removable hard disk, a read-only memory (ROM), a random access memory (RAM), a magnetic disk, or an optical disc.

The foregoing are merely example embodiments of the present application. A person skilled in the art may make various modifications and variations to the present application without departing from the spirit and scope of the present application. For example, specific shapes or structures of all components in the accompanying drawings in the embodiments of the present application may be adjusted according to an actual application scenario.

What is claimed is:

1. An apparatus for controlling running of multiple security software applications, the apparatus comprising:
a secure element comprising,
a processor configured to run secure operating system software and at least one security software application based on the secure operating system software, and a first random access memory configured to temporarily store secure temporary data generated during running of the secure operating system software and the at least one security software application;
at least one central processing unit coupled to the secure element and configured to:
run general-purpose operating system software, and communicate with the secure element under an action of the general-purpose operating system software; and
wherein the processor is further configured to:
when it is required to run a second security software application, suspend running of a first security software application in the at least one security software application, control migrating first temporary data generated during running of the first security software application from the first random access memory to a storage device disposed outside the secure element, and based on the secure operating system software, run the second security software application, and wherein second temporary data generated during running of the second security software application is temporarily stored in the first random access memory.

2. The apparatus according to claim 1, wherein the secure element and the at least one central processing unit are located in a first semiconductor chip in the apparatus.

3. The apparatus according to claim 1, wherein the storage device is located in a second semiconductor chip in the apparatus.

4. The apparatus according to claim 1, wherein the storage device comprises a second random access memory.

5. The apparatus according to claim 1, further comprising:
a third random access memory coupled to the secure element; and
wherein the processor is configured to:
migrate the first temporary data from the first random access memory to the third random access memory, and
migrate the first temporary data from the third random access memory to the storage device.

6. The apparatus according to claim 1, wherein the second security software application is a newly-started security software application.

7. The apparatus according to claim 1, wherein the processor is further configured to:
when it is required to run the second security software application, receive a user instruction sent by the at least one central processing unit to activate running of the second security software application, wherein the user instruction is triggered by an operation command delivered through a user interface of the general-purpose operating system software.

8. The apparatus according to claim 1, wherein the at least one security software application comprises:
at least one of a mobile payment software application or a subscriber identity module (SIM) card software application.

9. The apparatus according to claim 1, wherein security isolation exists between the general-purpose operating system software run by the at least one central processing unit and the secure element.

10. The apparatus according to claim 1, wherein the storage device comprises a secure storage area configured to temporarily store third temporary data of one or more security software applications that are temporarily suspended by the processor.

11. The apparatus according to claim 10, wherein the processor is further configured to:
when it is required to end a third security software application in the one or more security software applications that are temporarily suspended by the processor, control the storage device to delete fourth temporary data generated during running of the third security software application from the third temporary data.

12. The apparatus according to claim 1, wherein:
the second security software application is a security software application that is suspended by the processor and is run again; and
the processor is configured to:
when suspending the second security software application, migrate the second temporary data from the first random access memory to the storage device, and
when it is required to run the second security software application again, migrate the second temporary data from the storage device back to the first random access memory.

13. The apparatus according to claim 12, wherein the processor is further configured to:
obtain the second temporary data from the first random access memory, and before migrating the second temporary data to the storage device, perform at least one of encryption or a message authentication code (MAC) operation on the second temporary data; and
obtain the second temporary data from the storage device, and before migrating the second temporary data back to the first random access memory, perform at least one of decryption or a MAC verification operation on the second temporary data.

14. The apparatus according to claim 12, further comprising:
a cryptographic unit; and
wherein the processor is further configured to:
obtain the second temporary data from the first random access memory, before migrating the second temporary data to the storage device,
provide the second temporary data for the cryptographic unit,
receive the second temporary data after secure processing of the cryptographic unit, wherein the cryptographic unit is configured to perform at least one security processing of encryption or a message authentication code (MAC) operation on the second temporary data to obtain the second temporary data after secure processing,
obtain the second temporary data from the storage device,
before migrating the second temporary data back to the first random access memory,
provide the second temporary data for the cryptographic unit, and
receive the second temporary data after reverse security processing of the cryptographic unit, wherein the cryptographic unit is further configured to perform at least one reverse security processing of decryption or a MAC verification operation on the second temporary data, so as to obtain the second temporary data after reverse security processing.

15. The apparatus according to claim 13, wherein the processor is configured to:
suspend the second security software application for multiple times and migrate from the first random access memory to the storage device by the processor each time the second security software application is suspended, and wherein different keys are used to perform encryption or decryption on the second security software application each time the second security software application is suspended.

16. A method for controlling running of multiple security software applications, the method comprising:
running, by at least one central processing unit, general-purpose operating system software;
running, by a processor in a secure element, secure operating system software and at least one security software application based on the secure operating system software;
temporarily storing, by a first random access memory in the secure element, secure temporary data generated during running of the secure operating system software and the at least one security software application;
when it is required to run a second security software application, suspending, by the processor, running of a first security software application in the at least one security software application, migrating first temporary data generated during running of the first security software application from the first random access memory to a storage device disposed outside the secure element, and based on the secure operating system software, running the second security software application; and
temporarily storing, by the first random access memory, second temporary data generated during running of the second security software application.

17. The method according to claim 16, further comprising:
suspending the second security software application running the second security software application again;
when the second security software application is suspended, migrating, by the processor, the second temporary data from the first random access memory to the storage device; and
when it is required to run the second security software application again, migrating, by the processor, the second temporary data from the storage device back to the first random access memory.

18. The method according to claim 16, wherein security isolation exists between the general-purpose operating system software run by the at least one central processing unit and the secure element.

* * * * *